(12) United States Patent
Lo et al.

(10) Patent No.: US 7,332,990 B2
(45) Date of Patent: Feb. 19, 2008

(54) PORTABLE COMPUTER

(75) Inventors: Chien-Sheng Lo, Taipei (TW); Yu-Lin Fang, Taipei (TW); Hung-Cheng Lee, Jhonghe (TW)

(73) Assignee: ASUSTeK Computer Inc., Taipei (TW)

( * ) Notice: Subject to any disclaimer, the term of this patent is extended or adjusted under 35 U.S.C. 154(b) by 53 days.

(21) Appl. No.: 10/952,814

(22) Filed: Sep. 30, 2004

(65) Prior Publication Data

US 2005/0167992 A1 Aug. 4, 2005

(30) Foreign Application Priority Data

Jan. 29, 2004 (TW) .............................. 93102063 A

(51) Int. Cl.
*H01H 9/00* (2006.01)
(52) U.S. Cl. ...................... 335/205; 24/303; 292/251.5
(58) Field of Classification Search ........ 335/205–207; 24/303; 292/251.5
See application file for complete search history.

(56) References Cited

U.S. PATENT DOCUMENTS

| | | | | |
|---|---|---|---|---|
| 4,700,436 A | * | 10/1987 | Morita | .................. 24/303 |
| 5,611,120 A | * | 3/1997 | Riceman et al. | .............. 24/303 |
| 5,701,640 A | * | 12/1997 | Locher | ......................... 24/303 |
| 6,151,486 A | * | 11/2000 | Holshouser et al. | ..... 455/575.3 |
| 6,653,919 B2 | * | 11/2003 | Shih-Chung et al. | ....... 335/207 |
| 6,929,291 B2 | * | 8/2005 | Chen | ...................... 292/251.5 |
| 7,082,035 B2 | * | 7/2006 | Kim | .......................... 361/726 |
| 2005/0236848 A1 | * | 10/2005 | Kim | ........................ 292/251.5 |

* cited by examiner

*Primary Examiner*—Elvin Enad
*Assistant Examiner*—Bernard Rojas
(74) *Attorney, Agent, or Firm*—Birch, Stewart, Kolasch & Birch, LLP

(57) ABSTRACT

An electronic apparatus having a magnetic switch includes a first body, at least one magnetic component, a second body, and a magnetism barrier. In this case, the first body has at least one space. The magnetic component is accommodated in the space. The second body has at least one magnetizer, which is opposite to the magnetic component. The second body is pivoted on the first body. When the first body and the second body are closed, the magnetic component and the magnetizer face to each other. The magnetism barrier is disposed in the space of the first body. The magnetism barrier is disposed between the first body and the magnetic component.

16 Claims, 6 Drawing Sheets

PORTABLE COMPUTER

This Nonprovisional application claims priority under 35 U.S.C. § 119(a) on Patent Application No. 093102063 filed in Taiwan R.O.C. on Jan. 29, 2004, the entire contents of which are hereby incorporated by reference.

BACKGROUND OF THE INVENTION

1. Field of Invention

The invention relates to an electronic apparatus and, in particular, to an electronic apparatus, which comprises a magnetic component and a magnetism barrier to latch the apparatus.

2. Related Art

Along with the development of the electronic industry, the new electronic apparatuses always possess advanced and complex functions so as to provide convenience and comfort. Generally, a latching system is applied in the electronic apparatus to enhance its convenience.

A conventional portable computer (notebook) is taken for example and is described herein below. Referring to FIG. 1, a portable computer 1 comprises a cover panel 11, a mainframe 12, a pivot 13 and a latching system 14. The cover panel 11 is pivoted to the mainframe 12 with the pivot 13 and accordingly the cover panel 11 can be opened. The latching system 14 comprises a hook 141, a recess 142 and a push button 143. When closing the cover panel 11 and the mainframe 12, the hook 141 of the cover panel 11 is hooked on the recess 142 of the mainframe 12. The cover panel 11 can thus protect the keyboard buttons on the mainframe 12 and the display unit 15 on the inner side of the cover panel 11. It is easily for carrying when the cover panel 11 and the mainframe 12 are closed. To open the portable computer 1, the push button 143 connected to the hook 141 is pushed to unlatch the latching system 14.

As mentioned above, because it is necessary to push the push button 143 to unlock the hook 141, a springy element is needed in the electronic apparatus. The flexibility of the springy element should be adjusted, which is an additional step, during manufacturing processes. This additional step increases producing cost. Besides, the latching system 14 is mostly exposed of the cover panel 11 or the mainframe 12, and, consequently, it is not nice looking and the latching system 14 is easily broken or deformed during operation. Furthermore, to make it be latched tight, a latching system 14 with more complex structure is designed for the above case. However, this may not merely increase the difficulty for assembling but the hook 141 may not be latched smoothly, which makes users confused.

It is therefore a subjective of the invention to provide an electronic apparatus having a magnetic switch, which can solve the above-mentioned problems.

SUMMARY OF THE INVENTION

In view of the above-mentioned, the invention is to provide an electronic apparatus, which comprises a magnetic component to latch the apparatus.

To achieve the above, the electronic apparatus of this invention comprises a first body, at least one magnetic component, a second body and a magnetism barrier. In the invention, the first body has at least one containing space. The magnetic component is accommodated in the containing space. The second body has at least one magnetizer opposite to the magnetic component and is pivoted on the first body, wherein when the first body and the second body are closed, the magnetic component and the magnetizer face to each other. The magnetism barrier is disposed in the containing space and is positioned between the first body and the magnetic component.

As mentioned above, the electronic apparatus of the invention use at least one magnetic component cooperating with a magnetizer to latch the first and the second body. No conventional latching system is applied, so there is no drawback of the conventional latching system as mentioned above. According to the simple structure of the electronic apparatus of the invention, the assembling process of electronic apparatus of the invention is simpler than that of the conventional one, and it is more convenient for operation. In addition, there is no problem while latching the electronic apparatus and there is no need to push any button to open and to separate the first and the second bodies. Besides, the magnetic component and the magnetizer are not exposed out of the bodies, so the components are not easy to be deformed or to be broken, and the electronic apparatus is better looking in appearance. Moreover, the magnetism barrier can block the surplus magnetism to avoid degaussing other things by approaching the magnetic components.

BRIEF DESCRIPTION OF THE DRAWINGS

The invention will become more fully understood from the detailed description given hereinbelow illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
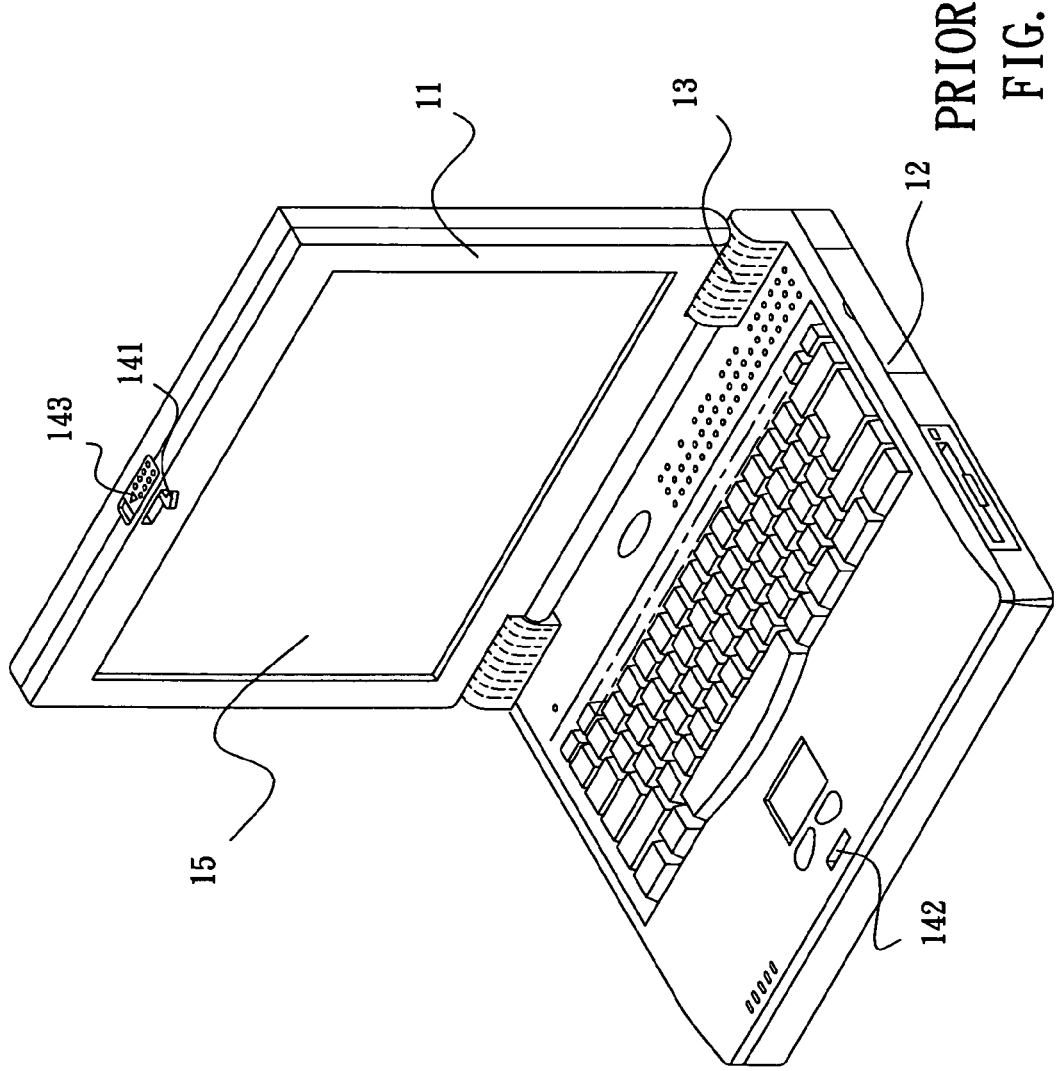
FIG. 1 is a schematic illustration showing a conventional portable computer.
Figure 2:
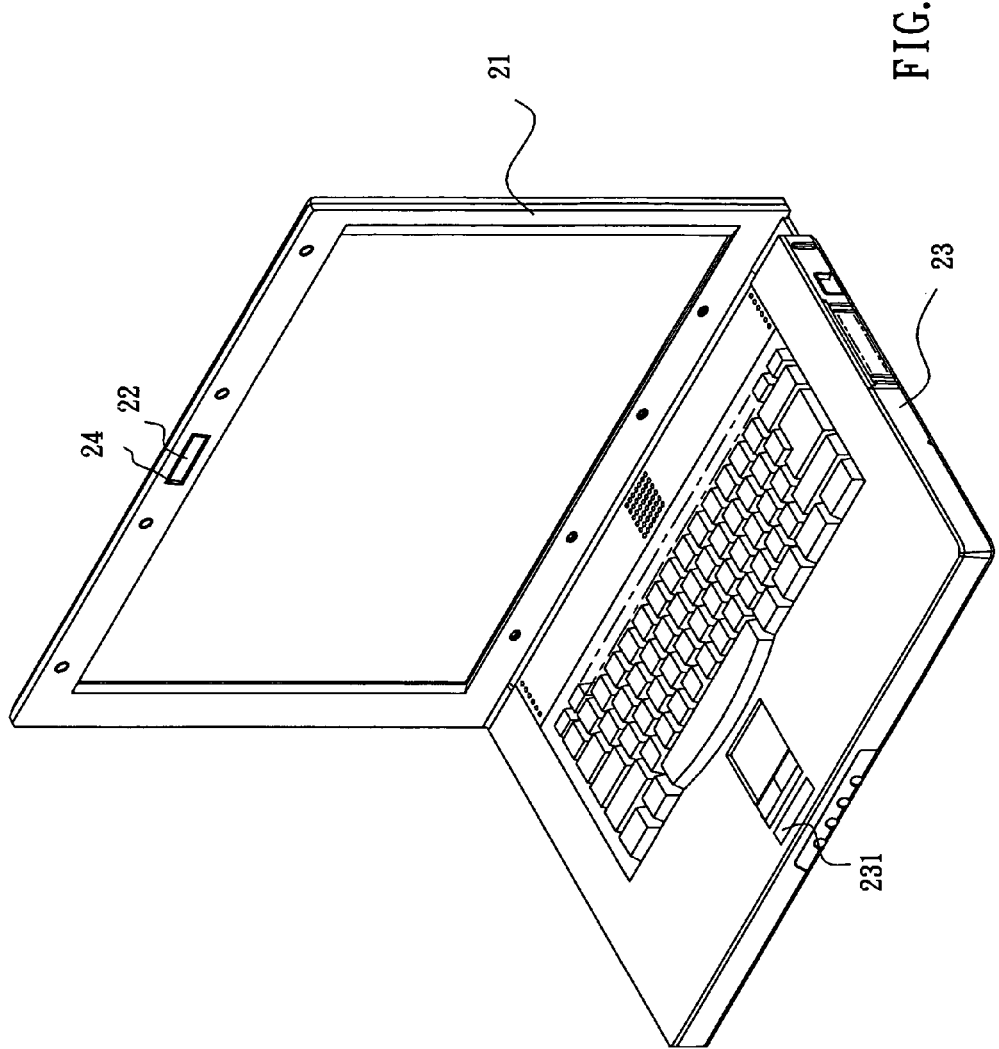
FIG. 2 is a schematic illustration showing an electronic apparatus having the magnetic switch according to an embodiment of the invention.
Figure 3A:
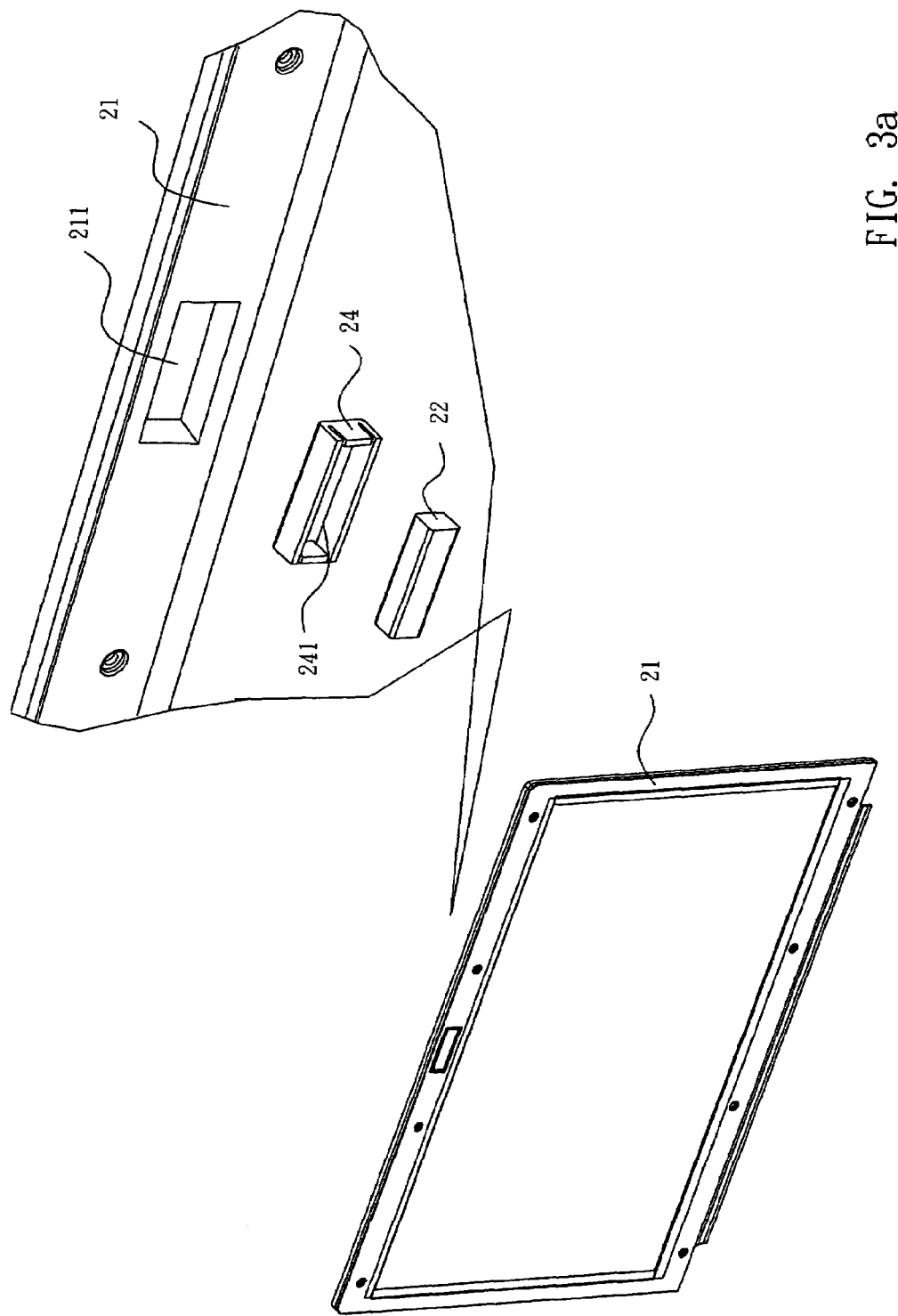
FIG. 3a and FIG. 3b are schematic illustrations showing a first body, a magnetic component and a magnetic barrier of the electronic apparatus according to the embodiment of the invention, wherein the magnetic component is an electromagnet in FIG. 3b.
Figure 4:
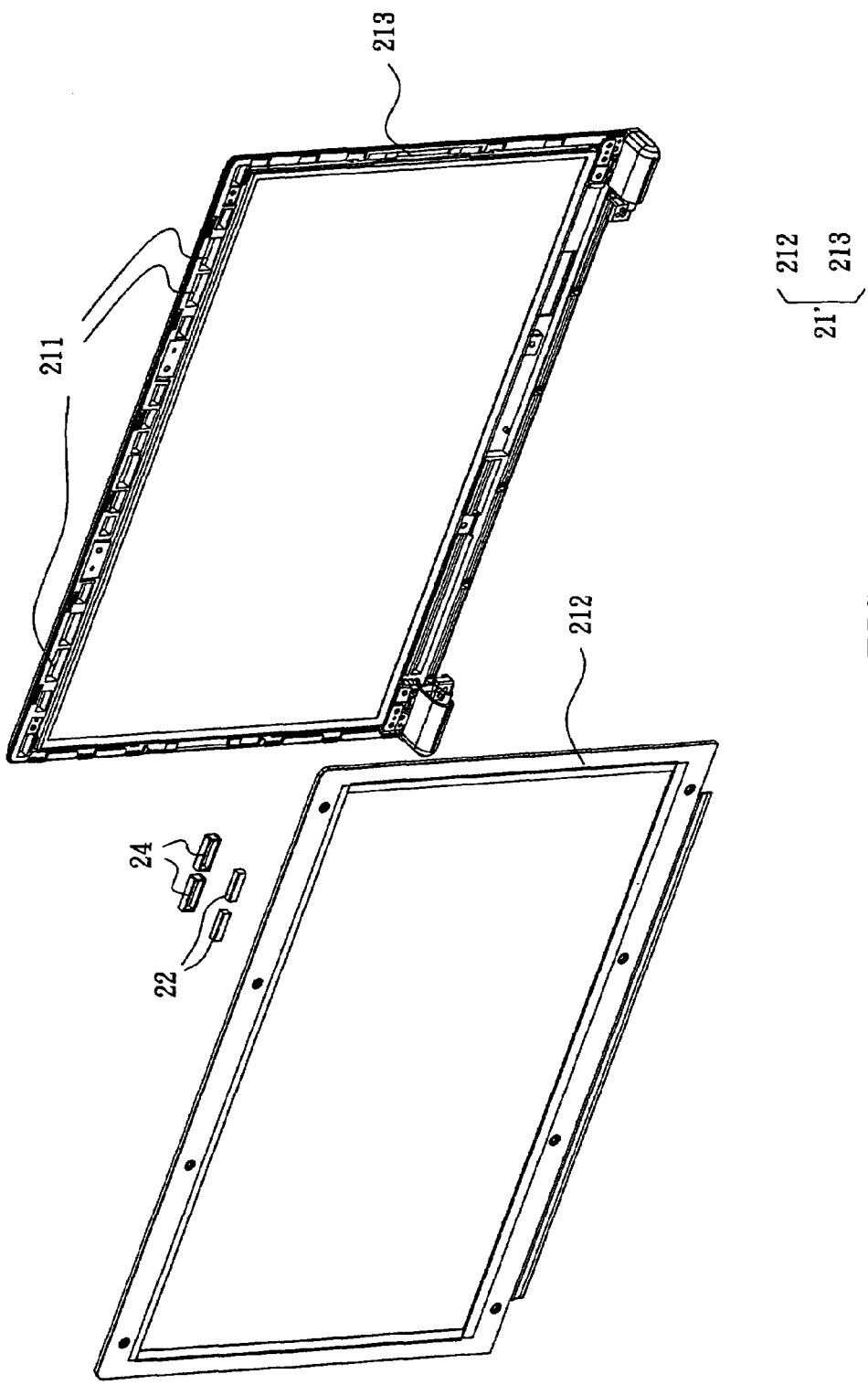
FIG. 4 is another schematic illustration showing a first body, a magnetic component and a magnetic barrier of the electronic apparatus according to the embodiment of the invention.

Referring to FIG. 2 and FIG. 3a, an electronic apparatus 2 having magnetic switch according to an embodiment of the invention comprises a first body 21, at least one magnetic component 22, a second body 23 and a magnetism barrier 24. In the embodiment, the electronic apparatus 2 roughly means a portable electronic product with data processing function, such as a notebook, a PDA, an electronic dictionary and etc. The embodiment takes a notebook for example to illustrate the electronic apparatus 2. In such a case, the first body 21 is an LCD comprising at least one containing space 211 (as shown in FIG. 3a) or several containing spaces 211 (as shown in FIG. 4).

Figure 3B:
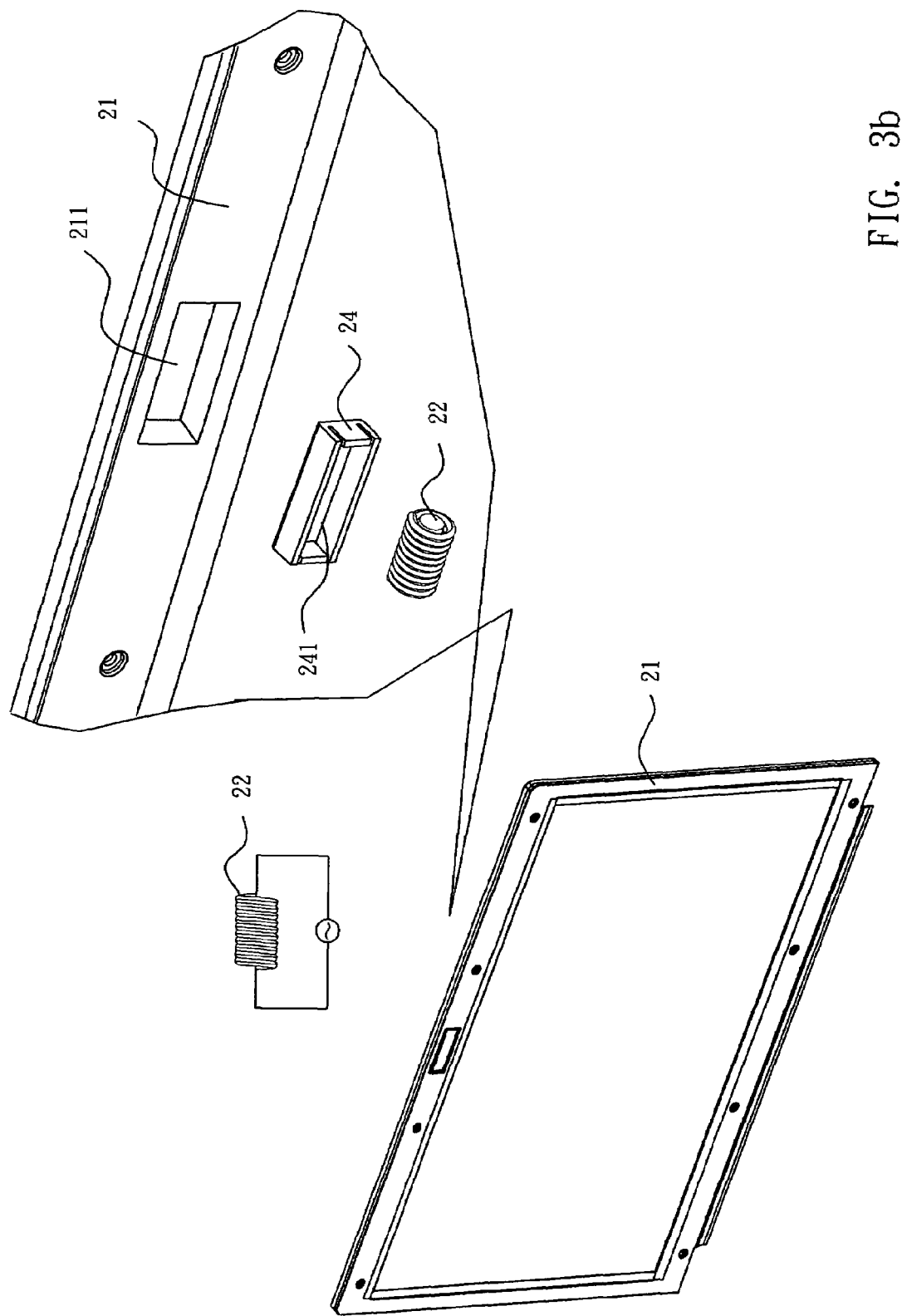

The magnetic component 22 is a magnet or an electromagnet (as shown in FIG. 3b), which is accommodated in the containing space 211. The magnetism of the magnetic component 22 is more than 4000 gauss, approximately.

The second body 23, which is a mainframe, and the first body 21 are pivoted to each other and are able to be opened and closed. Particularly speaking, in this embodiment, the first body 21 is an LCD while the second body is a mainframe though, they can be disposed in reverse. That is, the first body 21 is a mainframe and the second body 23 is an LCD.

Besides, to match the magnetic component 22 disposed on the first body 21, the second body 23 comprises at least one magnetizer 231 corresponding to the magnetic component 22. The magnetizer 231 is a flat metal plate made of the material such as iron, cobalt, manganese or nickel. The magnetizer 231 can also be a magnet or an electromagnet. Surely, the additional magnetizer 231 is not extra provided if the portion of the second body 23 opposite to the magnetic component 22 is made of a magnetized material. While the first body 21 and the second body 23 are closed, the magnetic component 22 is right facing to the magnetizer 231.

As Shown in FIG. 3a, the magnetism barrier 24 is disposed in the containing space 211 of the first body 21 and is positioned between the first body 21 and the magnetic component 22. The magnetism barrier 24 could be a rectangle case or a flat metal plate. In the embodiment, the magnetism barrier 24 is a rectangle case with an opening 241. The opening 241 is opposite to the magnetizer 231 (as shown in FIG. 2), so that the magnetic component 22 disposed in the opening 241 can magnetize the magnetizer 231.

The material of the magnetism barrier 24 comprises at least one metal, such as iron-platinum alloy or iron. The magnetism barrier 24 for accommodating the Magnetic component 22 is used to decrease the magnetism, for example below 200 gauss, to avoid degaussing other things. The magnetism barrier 24 can be a box shape to block the magnetism of the magnetic component 22 from the directions other than the latching direction (facing to the magnetizer 231), and further, to avoid degaussing other objects due to the magnetic component 22, for example, the credit cards or things with a magnetic stripe. Thus, only the side of the magnetic component 22 facing to the second body 23 is uncovered and is exposed out of the first body 21.

In addition, a first body 21' can be composed of a first case 212 and a second case 213, as shown in FIG. 4. In this case, the second case 213 has some containing spaces 211 for disposing the magnetic component 22 and the magnetism barrier 24. In this embodiment, the magnetism barrier 24 is a rectangle case, which is made of material comprising at least one metal, such as iron-platinum alloy or iron. The magnetic component 22 is disposed in the magnetism barrier 24 to avoid the magnetism from the direction other than that in which the magnetic component 22 is facing to the second body 23, and then to avoid degaussing objects such as credit cards or things with magnetic stripe. After disposing the magnetic component 22 and the magnetism barrier 24 into the containing space 211, the first case 212 and the second case 213 are assembled to complete the first body 21'. Therefore, the magnetic component 22 is not exposed out of the first body 21', and it is still able to close magnetic component 22 and the body 21'. As there is no need to drill an opening on the second case 213, the apparatus is better looking in appearance.

Figure 5:
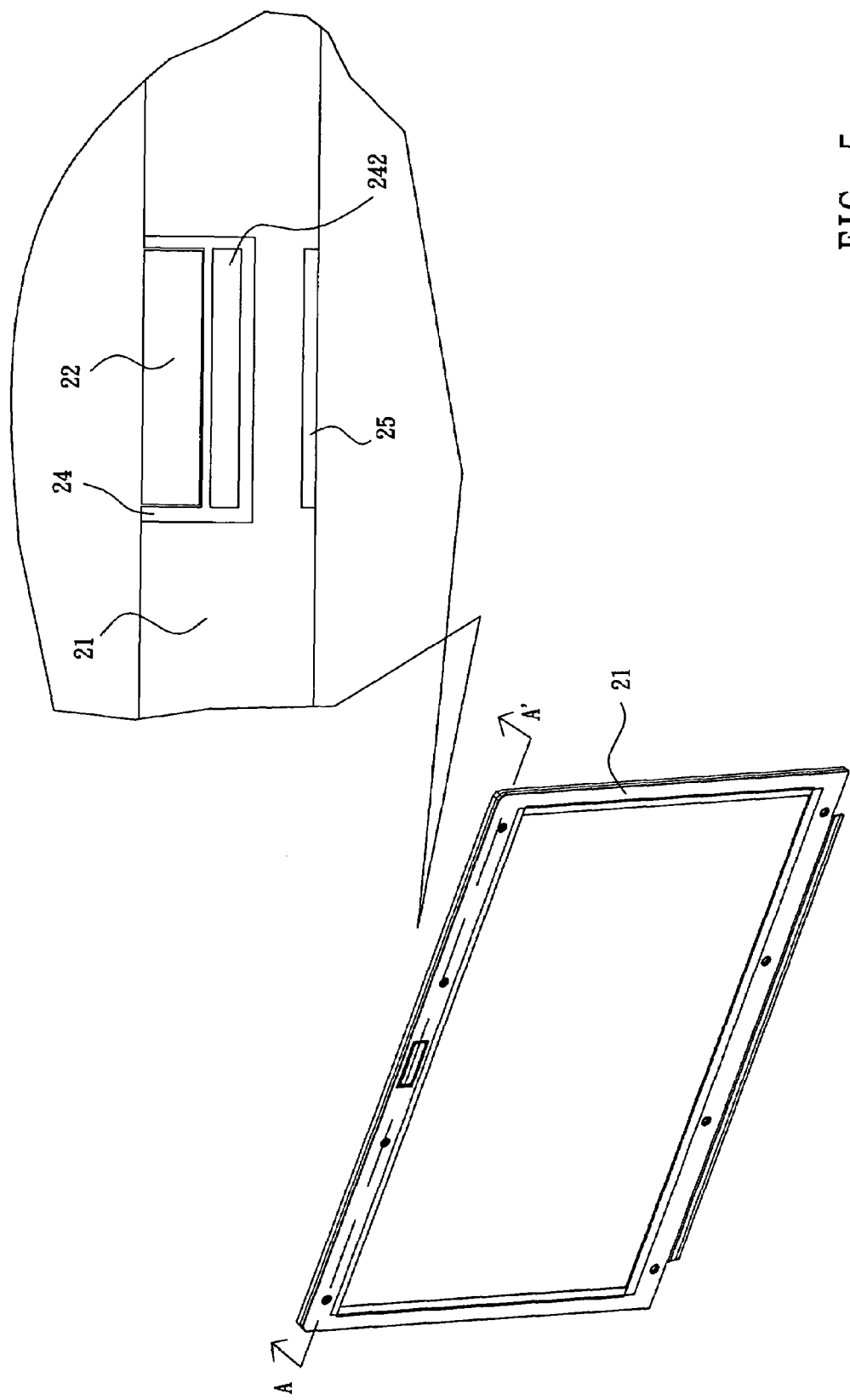
FIG. 5 is a sectional view showing the magnetic barrier of the electronic apparatus according to the embodiment of the invention.

Referring to FIG. 5, a sectional view along the dotted line A-A' of the first body 21 is shown, wherein the magnetism barrier 24 and the magnetic component 22 are disposed in the first body 21. In the embodiment, the magnetism barrier 24 further comprises a space 242 to enhance the magnetism blocking efficiency.

The first body 21 of this invention can further comprise a metal sheet 25, which is placed on the side of the magnetism barrier 24 opposite to the side of the magnetism barrier 24 facing to the magnetic component 22. The metal sheet 25 can further block the magnetism leakage of the magnetic component 22 so as to avoid degaussing other objects.

As mentioned above, the electronic apparatus of the invention comprises at least one magnetic component and a cooperating magnetizer as the latching system of the first and second bodies of the electronic apparatus. The conventional latching system is not applied, so there is no drawback of it. According to its simple structure, with comparing to the conventional art, the electronic apparatus of the invention has simpler manufacturing processes, is more convenient to operate, and has no problem of latching. The first and the second bodies are open and separate without pushing any button. Additionally, the magnetic component and the magnetizer are covered within the bodies, so these components are not easily deformed or broken. Thus, the electronic apparatus is better looking in appearance. Moreover, the magnetism barrier of the electronic apparatus of this invention can block the surplus magnetism of the magnetic component to avoid degaussing other things by approaching.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A portable computer, comprising:
a first body having at least a containing space;
a magnetism barrier case disposed in the containing space;
at least one magnetic component accommodated in the magnetism barrier case;
a second body having at least one magnetizer opposite to the magnetic component and pivoted on the first body;
a metal sheet placed on the side of the magnetism barrier case opposite to the side of the magnetism barrier case facing to the magnetic component so as to block the magnetism leakage of the magnetic component; and
wherein the material of the magnetism barrier case comprises at least one metal and the magnetism barrier case has an opening, when the first body and the second body are closed, the magnetic component and the magnetizer face to each other, one side of the magnetic component which faces to the magnetizer is exposed out of the opening of the magnetism barrier case so that the magnetism barrier case blocks the magnetism of other sides of the magnetic component.

2. The portable computer according to claim 1, wherein the magnetism barrier case is a rectangle case, and the magnetic component is accommodated at the opening.

3. The portable computer according to claim 1, wherein the magnetizer is a flat metal plate.

4. The portable computer according to claim 1, wherein the portable computer is a notebook.

5. The portable computer according to claim 1, wherein the first body comprises an LCD.

6. The portable computer according to claim 1, wherein the second body is a mainframe.

7. The portable computer according to claim 1, wherein the first body is a mainframe.

8. The portable computer according to claim 1, wherein the second body comprises an LCD.

9. The portable computer according to claim 1, wherein the magnetic component is a magnet.

10. The portable computer according to claim 1, wherein the magnetic component is an electro magnet.

11. The portable computer according to claim 1, wherein the magnetizer is a magnet.

12. The portable computer according to claim 1, wherein the magnetizer is made of iron.

13. The portable computer according to claim 1, wherein the magnetizer is an electromagnet.

14. The portable computer according to claim 1, wherein the metal is iron.

15. The portable computer according to claim 1, wherein the metal is iron-platinum alloy.

16. The portable computer according to claim 1, wherein the magnetism barrier case has a space, so as to enhance the magnetism blocking efficiency of the magnetism barrier ease.

* * * * *